United States Patent [19]
Owen

[11] 3,852,278
[45] Dec. 3, 1974

[54] PREPARATION OF 4-(2-(FURFURYLIDENEAMINO)-PHENYL)-3-THIOALLOPHANATES

[75] Inventor: Ronald P. Owen, Warminster, Pa.

[73] Assignee: Rohm and Haas Company, Philadelphia, Pa.

[22] Filed: Jan. 22, 1973

[21] Appl. No.: 325,783

[52] U.S. Cl.......... 260/240 A, 424/285, 260/240 G, 260/455 A
[51] Int. Cl............................................. C09b 23/00
[58] Field of Search..................... 260/240 A, 240 G

[56] References Cited
FOREIGN PATENTS OR APPLICATIONS
1,214,415   12/1970   Great Britain.................. 260/240 G

OTHER PUBLICATIONS

Chemical Abstracts, vol. 73, abstract no. 14523s, (1970), (Abst. of German Offen. No. 1,930,540).

Primary Examiner—John D. Randolph

[57] ABSTRACT

A method for preparing 4-[2-(furfurylideneamino)-phenyl]-3-thioallophanates which comprises reaction of an o-furfurylideneaminoaniline with a hydrocarbyloxycarbonyl isothiocyanate in the presence of a tertiary amine. These 3-thioallophanates are fungicides.

10 Claims, No Drawings

PREPARATION OF 4-(2-(FURFURYLIDENEAMINO)-PHENYL)-3-THIOALLOPHANATES

This invention is concerned with a method for preparing compounds of the formula

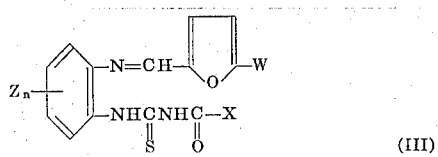

(III)

wherein X is $R^1O-$ or $R^1S-$ wherein $R^1$ is
a. alkyl, straight or branched, of 1 to 12 carbon atoms,
b. alkyl of 1 to 12 carbon atoms substituted with halo, preferably chloro, or methoxy groups
c. alkenyl of 2 to 12 carbon atoms,
d. alkynyl of 3 to 12 carbon atoms,
e. phenyl,
f. phenyl substituted with halo, preferably chloro, methyl, methoxy or nitro,
g. benzyl or
h. benzyl substituted with halo, preferably chloro, methyl, methoxy or nitro;

W is hydrogen, acetoxymethyl, chloro, methyl or nitro;
Z is halo, preferably chloro, methyl, methoxy or nitro and
n is an integer 0 to 3.

Typical alkyl groups represented by $R^1$ are methyl, ethyl, propyl, isopropyl, butyl, sec-butyl, tert-butyl, amyl, isoamyl, hexyl, heptyl, octyl, 1-methylheptyl, 1,1,3,3-tetramethylbutyl, nonyl, decyl and dodecyl. The preferred alkyl groups are methyl and ethyl.

These compounds are useful as fungicides and particularly as systemic fungicides.

The novel method of preparation for the compounds of Formula III consists in reacting a compound of the formula

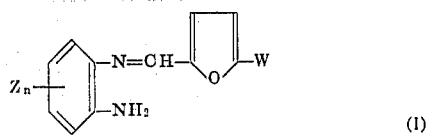

(I)

with an isothiocyanate of the formula

(II), wherein W, X, Z and n have the meanings given above, in the presence of an organic base of the tertiary amine type.

The o-furfurylideneaminoanilines (Formula I), are discussed in the literature, for example see Chemical Abstracts 61,8280b and 14860f (1964) and 67, 11629m (1967). They are made by the reaction of an o-phenylenediamine with an equivalent amount of a furfuraldehyde, in the presence of a tertiary amine if desired, according to the following reaction

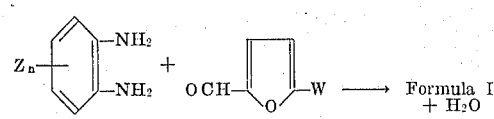

wherein W, Z and n have the above meanings. The reaction is usually run in the presence of an inert solvent such as benzene or toluene. The reaction is mostly usually run at the reflux temperature of the solvent but often in the range of 50° – 150°C. Alcohol may be used as the solvent but in this case the reaction is run at 0°C. or less. The reaction may be promoted by removal of the water as formed. The presence of a tertiary base such as triethylamine or dimethylaniline sometimes serves as a stabilizing agent but is not necessary.

The isothiocyanates of Formula II are readily made by literature methods. One such procedure is to react a chloroformate ester with ammonium or potassium thiocyanate in the presence of an inert solvent such as acetone, 2-methoxyethanol (glyme), ethyl acetate, butyl acetate, or toluene, with heating, for example in the range of 25°–100°C. The following equation depicts such a reaction with potassium thiocyanate

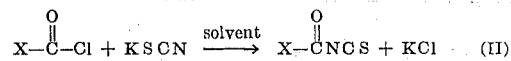

The isothiocyanate may be purified by distillation but in the process there often is considerable thermal degradation or polymerization. Accordingly it is usually preferred to use the crude isothiocyanate from the reaction, as identified by infrared analysis, for a subsequent reaction with an amine.

The tertiary amine compounds which may be used are those having an ionization constant at 25°C. in the range of $5 \times 10^{-3}$ to $5 \times 10^{-5}$. Typical of such tertiary amines are trimethylamine, triethylamine, tripropylamine, triisobutylamine, methyldiethylamine, tetramethylethylenediamine N,N-dimethylethanolamine and dimethyl aniline. Preferred tertiary amine compounds are triethylamine and tripropylamine. The amount of amine is usually in the range of 0.5 – 20 mole percent. For example with triethylamine of molecular weight 101, this would be 0.5 g. to 20 g. per mole of the reactants. The amount usually employed is in the range of 5 – 15 mole percent. The amine may be added to the o-furfurylideneaminoaniline reactants or to the hydrocarbyloxycarbonyl isothiocyanate reactant or may be divided between the two.

The reaction of an o-furfurylideneaminoaniline of Formula I with an isothiocyanate of Formula II in the presence of a tertiary amine ($R_3N$) is usually carried out in an inert solvent such as ether, glyme, ethyl acetate, butyl acetate or toluene. The reactants may be in equimolar amount but often the isothiocyanate is in up to 100 percent excess, and preferably in 20 – 40 percent excess. The reaction is a facile one and proceeds in the temperature range of −20°C upward quite readily. The 4-[2-(furfurylideneamino)phenyl]-3-thioallophanates of Formula III usually crystallize from the reaction mixture and are purified by common procedures such as recrystallization. Extensive heating of these compounds is to be avoided as it may lead to the formation of a benzimidazole. The following equation depicts the reaction

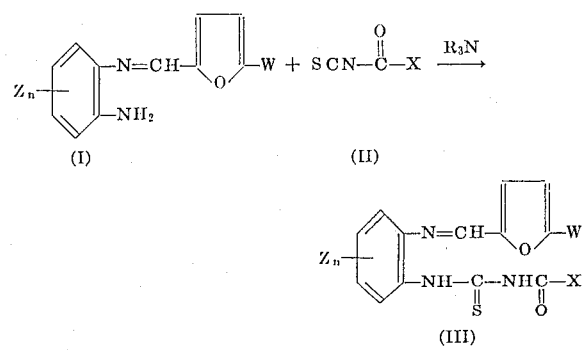

The necessity for having a tertiary amine, such as triethylamine, present during the reaction of Formula I compounds with Formula II compounds was demonstrated by the following experiments.

A. Literature procedure for preparing a 4-[2-(benzylideneamino)phenyl]-3-thioallophanate.

British Pat. No. 1,214,415 (Derwent Publications Central Patents Index basic number H-8890) states (page 2) that the following reaction was used to prepare alkyl 4-[2-(benzylideneamino)phenyl]-3-thioallophanates:

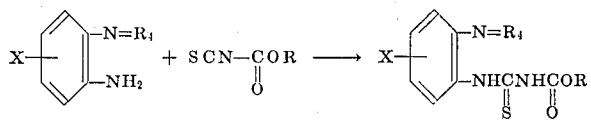

wherein
X is hydrogen, chlorine, nitro or methyl
R is alkyl of 1 to 4 carbon atoms and
$R_4$ is benzal or benzal substituted with chlorine, nitro or methoxy.

The patent states that the reaction can be carried out in an inert organic solvent such as acetone, ethyl acetate, methyl ethyl ketone, methanol, ethanol, dioxane, benzene or toluene, at a temperature of —20° to 50°C, preferably —10° to 30°C, ordinarily in 10 minutes to one hour, but occasionally in several hours. No further details are given.

A reaction typical of this procedure was run as follows. To o-phenylenediamine (15 g., 0.139 mole) in toluene at 80°C was added benzaldehyde (15 g., 0.142 mole). The reaction mixture was slowly distilled at about 80° C to remove the solvent and water and to concentrate the mixture to give a 40 g. residue of o-benzylideneaminoaniline (Solution A). To potassium thiocyanate (20.2 g., 0.21 mole) in 75 ml. of ethyl acetate at 45°C was added methyl chloroformate (19.8 g., 0.21 mole). The resulting slurry was stirred for 2 hours at 45°C. and then cooled to 10°C. This is a slurry of methoxycarbonyl isothiocyanate and to it was slowly added the above designated Solution A at 35°C. The reaction mixture was then stirred for 1 hour. The solid precipitate was filtered off, washed with water and dried. The product was 24.5 g. and was a 55 percent yield of methyl 4-[2-(benzylideneamino)phenyl]-3-thioallophanate melting at 142°–144°C. It is concluded that the general procedure of British Pat. No. 1,214,415 is quite an acceptable one for preparing this type of Schiff base of a benzaldehyde.

B. Unsuccessful attempts to follow the teachings of British patent 1,214,415 for preparing a 4-[2-(furfurylideneamino)-phenyl]-3-thioallophanate.

PROCEDURE 1 o-Phenylenediamine (30.0g., 0.278 mole) in 365 ml. of toluene was heated to 60°C under vacuum until the toluene started to distill. Furfural (28.0g., 0.292 mole) was then added in 15 minutes and the toluene and water were distilled off until 81.5g. of a concentrated toluene solution of the product remained (Solution B).

To potassium thiocyanate (40.5g., .417 mole) in 150 ml. of ethyl acetate at 45°C. was quickly added methyl chloroformate (40.5g., 0.428 mole). The reaction mixture was stirred for 2 hours at 45°C. then cooled to 10°C. This is the methoxycarbonyl isothiocyanate reactant.

To the above cold methoxycarbonyl isothiocyanate solution was slowly added Solution B at less than 35°C. The contents of the flask became very dark. The reaction mixture was stirred 1 hour at ambient temperature and then cooled to 10°C. A solid separated and was filtered off, washed with ether, slurried with 300 ml. of water and dried to give 50.2g. A 5g. portion was washed in hot benzene and dried to give an impure solid melting with decomposition at 135° – 136°C. It was identified by its infrared spectrum to be 1,2-bis-(3-methoxycarbonyl-2-thioureido)benzene,

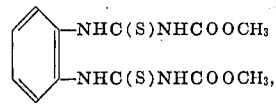

see Belgium Pat. No. 722,080.

PROCEDURE 2

To o-phenylenediamine (30g., 0.278 mole) in 325 ml. of methanol was added dropwise at 0°C. furfural (28g., 0.292 mole). The reaction mixture was stirred at 0°C. for 1 hour, and then concentrated at ambient temperature to give 82.7g. of an oil concentrate. (Solution C).

To potassium thiocyanate (40.5g., 0.417 mole) in 110 ml. of acetone was added methyl chloroformate (39.8g., 0.417 mole). The reaction mixture was stirred at reflux for 0.5 hour and then cooled to 0°C. This is the methoxycarbonyl isothiocyanate reactant.

To the above methoxycarbonyl isothiocyanate slurry at 0°C. was slowly added Solution C. When the addition was complete the reaction mixture was allowed to warm to room temperature over a 0.5 hour period. To this was added 732 ml. of water and a tarry residue separated. All attempts to isolate a characterizable product from this organic residue were unsuccessful.

C. Successful preparations of 4-[2-(furfurylideneamino)-phenyl]-3-thioallophanate

PROCEDURE 1

To o-phenylenediamine (60g., 0.56 mole) in 500 ml. of toluene at 35°C. was added N,N-dimethylaniline (5g., 0.04 mole) and furfural (56g., 0.58 mole). The toluene and water were distilled off at 35°C. under 50 mm. vacuum until 150.3g. of a concentrated toluene solution remained. To this solution was added triethylamine (4g., 0.04 mole) and it was allowed to cool to ambient temperature (Solution D).

To potassium thiocyanate (81g., 0.835 mole) slurried in 300 ml. of butyl acetate of 60°C. was rapidly added methyl chloroformate (81g., 0.86 mole). The reaction mixture as a yellow slurry was stirred 2 hours at 60°C. The product was cooled to 10°C. and triethylamine (2g., 0.02 mole) was added. This is the methoxycarbonyl isothiocyanate reactant.

To the above cooled methoxycarbonyl isothiocyanate solution was added Solution D at less than 35°C. The reaction C. was stirred 1 hour and then cooled to 10°C. to give a solid precipitate. The solid was removed by filtration, slurried in 600 ml. of water and dried to give 151.5g. of product melting at 154°–155°C. By analysis this was found to contain 54.6% C, 4.2% H and 14.0% N; calculated for $C_{14}H_{13}N_3O_3S$ is 55.3% C, 4.4% H, and 13.8% N. The product is a 90% weight yield of 4-[2-(furfurylideneamino)-phenyl]-3-thioallophanate. This structure was confirmed by its infrared spectrum. It had some potassium chloride impurity.

PROCEDURE 2

To o-phenylenediamine (30g., 0.278 mole) in 325 ml. of toluene at 60°c. was added furfural (28 g., 0.292 mole). The toluene-water mixture was distilled off at 60°C. under 130 mm. vacuum until 55 g. of residue remained in the flask. To this was added triethylamine (2g., 0.02 mole) (Solution E).

To potassium thiocyanate (40.5g., 0.417 mole) slurried in 150 ml. of ethyl acetate at 45°C. was rapidly added methyl chloroformate (40.5g, 0.429 mole). This was stirred for 2 hours at 45°C. and then cooled to 10°C. This is the methoxycarbonyl isothiocyanate reactant.

To the above methoxycarbonyl isothiocyanate slurry was added triethylamine (4g., 0.04 mole) and then Solution E at less than 35°C. over a period of 15 minutes. After stirring for 1 hour the solid was filtered off, washed with 300 ml. of water and dried to give 57.3g. of product melting at 154°–155°C. The solid was found by analysis to contain 55.3% C, 4.3% H and 13.7% N; calculated for $C_{14}H_{13}N_3O_3S$ is 55.4% C, 4.3% H, and 13.85% N. The product was a 68 percent yield of 4-[2-(furfurylideneamino)phenyl]-3-thioallophanate.

The following Table I gives the structure of related 4-[2-(furfurylideneamino)phenyl]-3-thioallophanate made by the successful procedures illustrated in item C, above.

Table II gives the decomposition or melting points and analytical data on these samples.

TABLE I $Z_n$—⟨phenyl⟩—N=CH—⟨furan⟩—W Preparations
   —NHCNHC—X
      ‖  ‖
      S  O

| Example | X | W | Z |
|---|---|---|---|
| 1 | OCH₃ | H | H |
| 2 | OC₂H₅ | H | H |
| 3 | SC₂H₅ | H | H |
| 4 | OC₄H₉-n | H | H |
| 5 | OC₈H₁₇-n | H | H |
| 6 | OC₆H₅ | H | H |
| 7 | OCH₃ | CH₃ | H |
| 8 | OCH₃ | CH₃C(O)OCH₂ | H |
| 9 | OCH₃ | H | 4 (or 5)-Cl |
| 10 | OCH₃ | H | 4 (or 5)-CH₃ |
| 11 | OCH₃ | H | 4 (or 5)-OCH₃ |
| 12 | OCH₃ | H | 4,5-Cl₂ |
| 13 | OCH₃ | NO₂ | H |
| 14 | OCH₂CCl₃ | H | H |
| 15 | OCH₂CH=CH₂ | H | H |
| 16 | OCH₂C₆H₅ | H | H |

Table II

| Example | Melting Point (°C)(d)* | Empirical Formula | Analysis** | | | | |
|---|---|---|---|---|---|---|---|
| | | | C | H | N | O | S |
| 1 | 155–6(d) | C₁₄H₁₃N₃O₃S | 55.5(55.3) | 4.3(4.4) | 13.9(13.8) | 15.9(16.0) | 10.0(10.5) |
| 2 | 113–115(d) | C₁₅H₁₅N₃O₃S | 56.9(57.2) | 4.8(4.8) | 13.3(13.1) | 15.1(15.2) | 10.1(9.8) |
| 3 | 157–158(d) | C₁₅H₁₅N₃O₂S₂ | 54.0(54.0) | 4.5(4.7) | 12.6(12.7) | 9.6(10.1) | 19.2(19.3) |
| 4 | 122–124(d) | C₁₇H₁₉N₃O₃S | 59.2(58.9) | 5.6(5.9) | 12.2(12.1) | 13.9(14.1) | 9.3(9.4) |
| 5 | 84–85(d) | C₂₁H₂₇N₃O₃S | 62.4(62.8) | 6.6(6.3) | 10.4(10.5) | 12.2(12.0) | 8.1(8.0) |
| 6 | 172–173(d) | C₁₉H₁₅N₃O₃S | 62.5(62.7) | 4.1(4.2) | 11.5(11.8) | 13.1(13.3) | 8.2(8.2) |
| 7 | 127–128(d) | C₁₅H₁₅N₃O₃S | 56.8(57.4) | 4.8(4.8) | 13.2(13.3) | 15.2(15.6) | 10.1(10.0) |
| 8 | 149–150 | C₁₇H₁₇N₃O₆S | 54.4(54.3) | 4.5(4.6) | 11.2(11.2) | 21.3(21.6) | 8.6(8.5) |
| 9 | 188–189 | C₁₄H₁₂ClN₃O₂S | 49.6(49.6) | 3.6(3.5) | 12.5(12.2) | 14.3(14.6) | 9.5(9.5) |
| 10 | 168–169(d) | C₁₅H₁₅N₃O₃S | 56.8(57.0) | 4.8(4.9) | 13.3(13.1) | 15.2(15.1) | 10.1(9.8) |
| 11 | 163–164(d) | C₁₅H₁₅N₃O₄S | 54.0(54.4) | 4.6(4.7) | 12.6(12.5) | 19.2(19.3) | 9.6(9.6) |
| 12 | 202–203 | C₁₄H₈Cl₂N₃O₃S | 45.5(45.6) | 2.1(2.7) | 11.4(11.2) | 13.2(13.2) | 8.6(8.8) |
| 13 | 206–208(d) | C₁₄H₁₂N₄O₅S | 48.2(48.6) | 3.5(3.4) | 16.1(16.0) | 23.0(22.9) | 9.2(8.9) |
| 14 | 166–167(d) | C₁₅H₁₂Cl₃N₃O₃S | 42.8(43.0) | 2.9(3.0) | 10.0(9.8) | 11.4(11.4) | 7.6(7.9) |
| 15 | 108–110(d) | C₁₆H₁₅N₃O₃S | 58.3(58.3) | 5.2(4.6) | 12.9(12.8) | 15.0(14.6) | 8.9(8.7) |
| 16 | 161–162(d) | C₂₀H₁₇N₃O₃S | 62.0(63.1) | 4.5(4.5) | 10.7(11.1) | 13.0(12.7) | (3.5) |

* With decomposition
** The number in parenthesis represents the theoretical value as calculated from the empirical formula The 4-[2-(furfurylideneamino)phenyl]-3-thioallophanates made by the novel process of this invention are excellent agricultural fungicides. They are particularly useful for the control of phytopathogenic fungi belonging to the Ascomycetes and Fungi Imperfecti groups. Representative compounds of this invention have been found to control botrytis blight caused by *Botrytis cinerea*, bean powdery mildew caused by *Erysiphe polygoni*, rice blast caused by *Piricularia oryzae*, cercospora blight caused by *Cercospora apii* and wheat leaf rust caused by *Puccinia recondita*.

I claim:

1. A method for preparing a compound of the formula

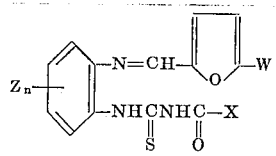

wherein X is R¹O— or R¹S—
wherein R¹ is
   a. alkyl, straight or branched, of 1 to 12 carbon atoms,
   b. alkyl of 1 to 12 carbon atoms substituted with halo, or methoxy groups,
   c. alkenyl of 2 to 12 carbon atoms,
   d. alkynyl of 3 to 12 carbon atoms,
   e. phenyl,
   f. phenyl substituted with halo, methyl, methoxy or nitro,
   g. benzyl or
   h. benzyl substituted with halo, methyl, methoxy or nitro;
W is hydrogen, acetoxymethyl, chloro, methyl, or nitro;
Z is halo, methyl, methoxy or nitro and
$n$ is an integer 0 to 3,
which comprises mixing at a temperature in the range of −20° C. to about 35° C. and thereby reacting a compound of the formula

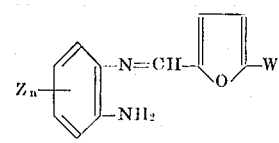

wherein W, Z and n have the above meanings with a compound of the formula

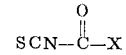

wherein X has the above meanings in an inert solvent containing 0.5 to 20 mole percent of a tertiary amine selected from the group consisting of trimethylamine, triethylamine, tripropylamine, triisobutylamine, methyldiethylamine, tetramethylethylenediamine, N,N-dimethylethanolamine and dimethylaniline.

2. A method according to claim 1 wherein W of the formulas is hydrogen.

3. A method according to claim 1 wherein $n$ of the formulas is 0.

4. A method according to claim 2 wherein $n$ of the formulas is 0.

5. A method according to claim 1 wherein X is methoxy.

6. A method according to claim 1 wherein X is ethoxy.

7. A method according to claim 1 wherein the tertiary amine is triethylamine.

8. A method according to claim 4 wherein the tertiary amine is triethylamine.

9. A method according to claim 5 wherein the tertiary amine is triethylamine.

10. A method according to claim 1 for preparing 4-[2-(furfurylideneamino)phenyl]-3-thioallophanate.

* * * * *